US008756456B2

(12) United States Patent
Katayama et al.

(10) Patent No.: US 8,756,456 B2
(45) Date of Patent: Jun. 17, 2014

(54) CONTROL AND MONITORING FOR FAST MILLIMETER-WAVE LINK USING OUT-OF-BAND WIRELESS CHANNEL

(75) Inventors: Yasunao Katayama, Kanagawa-ken (JP); Nobuyuki Ohba, Miyagi (JP); Kohji Takano, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 13/371,560

(22) Filed: Feb. 13, 2012

(65) Prior Publication Data

US 2012/0210167 A1    Aug. 16, 2012

(30) Foreign Application Priority Data

Feb. 16, 2011    (JP) ................................. 2011-031231

(51) Int. Cl.
*G06F 11/00*    (2006.01)
(52) U.S. Cl.
USPC ............................. 714/18; 714/748; 714/815
(58) Field of Classification Search
CPC ............ G06F 11/0757; G06F 11/2007; G06F 11/1402; G01R 31/31725; H04L 1/1848; H04L 43/50; H04L 43/0858
USPC .......................... 714/18, 55, 56, 712, 748, 815
See application file for complete search history.

(56) References Cited

U.S. PATENT DOCUMENTS

| | | | | |
|---|---|---|---|---|
| 5,754,754 A  * | 5/1998 | Dudley et al. | .................... | 714/18 |
| 8,160,835 B2 * | 4/2012 | Doerken et al. | ............. | 702/122 |
| 8,370,693 B2 * | 2/2013 | Woo et al. | ..................... | 714/747 |
| 2003/0198309 A1 * | 10/2003 | Abrosimov et al. | .......... | 375/354 |
| 2006/0233111 A1 * | 10/2006 | Wright | ......................... | 370/241 |
| 2008/0077838 A1 * | 3/2008 | Hsu et al. | ...................... | 714/748 |
| 2008/0205288 A1 * | 8/2008 | Herzog | ......................... | 370/252 |
| 2009/0006920 A1 * | 1/2009 | Munson et al. | ............... | 714/748 |
| 2012/0054376 A1 * | 3/2012 | Vaynberg et al. | ............... | 710/18 |

FOREIGN PATENT DOCUMENTS

JP    3351653    10/1996

* cited by examiner

*Primary Examiner* — Marc Duncan
(74) *Attorney, Agent, or Firm* — Vazken Alexanian

(57) ABSTRACT

A method for fast and efficient data downloading in wireless communications. The method includes ways to download file data of a large size from a server (access point) to a user's client (mobile device) at high speed and efficiency by using both mmWave wireless communication and conventional wireless communication (WiFi, 3G, etc.). A server transmits packetized file data to a client. The file data is transmitted as data packets via mmWave. In parallel, the server transmits check packets (roll-call packets) corresponding to the data packets. As a test at the time of establishing links, the latency for each communication line is measured. The receiver side, upon completion of receiving the check packets, checks whether their corresponding mmWave packets have arrived. If any corresponding mmWave packet has not arrived, it is determined that the mmWave packet has been lost and a retransmission request is immediately returned to the server via WiFi.

13 Claims, 3 Drawing Sheets

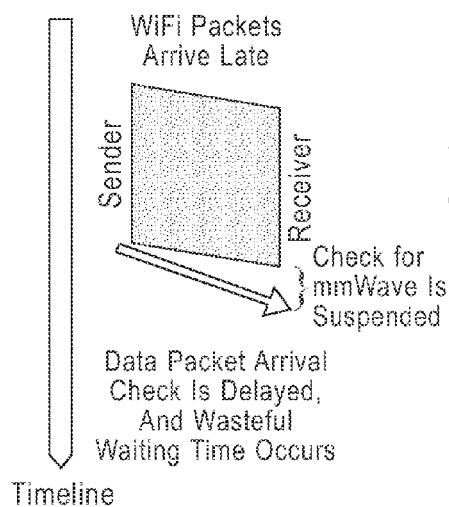
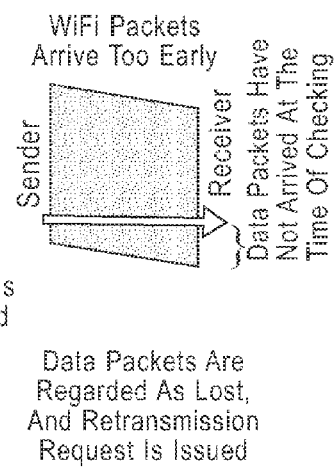
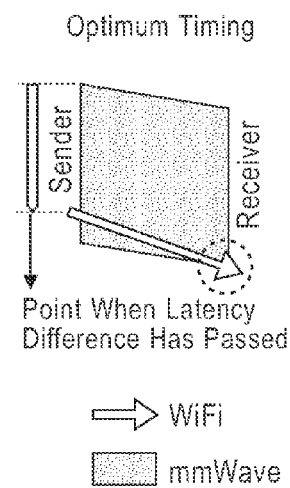
Reception Timing Of mmWave Data Packets And WiFi Check-Out Packets
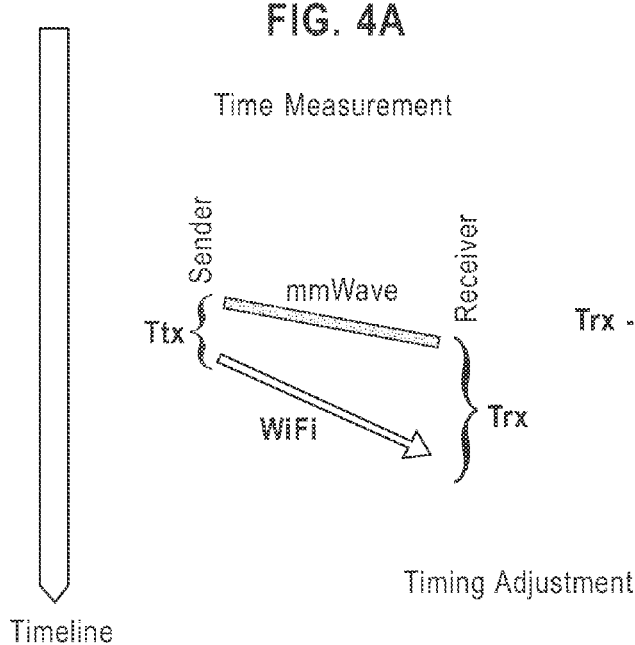
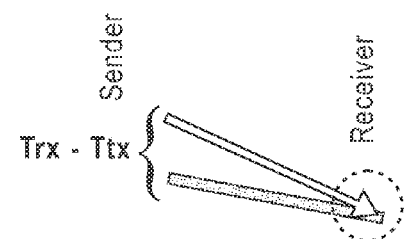

CONTROL AND MONITORING FOR FAST MILLIMETER-WAVE LINK USING OUT-OF-BAND WIRELESS CHANNEL

CROSS REFERENCE TO RELATED APPLICATION

This application claims priority under 35 U.S.C. 119 from Japanese Application 2011-031231, filed Feb. 16, 2011, the entire contents of which are incorporated herein by reference.

BACKGROUND OF THE INVENTION

1. Field of the Invention

The present invention relates to fast and efficient data downloading in wireless communications.

2. Description of Related Art

There exists a technique for downloading a large amount of data from a server (access point) to a client (mobile device) at a high speed by using millimeter wave (mmWave) wireless communication and conventional wireless communication (WiFi, Bluetooth, 3G, etc.).

An example of a common application of this technique in daily life is the file downloading services provided at a Kiosk. This is an on-demand data transfer service in railway stations in Japan such that a mobile user can instantly download multimedia, such as video and books, during the user's travel.

A communication line using mmWave is characterized by fast data transmission capabilities, but low robustness when compared with conventional wireless communication. On the other hand, conventional wireless communication is characterized by high robustness, but a relatively low data transmission rate (communication speed) when compared with mmWave.

The above characteristics are summarized in the table below.

|  | In-band mmWave | Out-of-band conventional wireless link (WiFi, 3G, Bluetooth, etc.) |
| --- | --- | --- |
| Data transmission rate | high | low |
| Robustness | low | high |

An ideal situation is if the two types of wireless communication with different characteristics can be complimentarily used to realize fast and efficient file transfer. That is, to make use of the high speed of mmWave, highly robust control is necessary. Control here includes connection and disconnection of the link, and detection and retransmission of lost packets. For efficient transfer, the packet loss must be quickly detected and the lost packets must immediately be retransmitted.

Japanese Patent No. 3351653 discloses a technique of retransmitting a packet by using both a high-speed line and a low-speed line. The technique addresses data retransmission for a data error determined by an error check, but no description is given for the case of packet loss.

Another known technique is packet loss detection based on timeout, as used in protocols such as the TCP/IP protocol. Unfortunately, application of this technique to a Kiosk download service would not be efficient due to the need to wait until timeout.

BRIEF SUMMARY OF THE INVENTION

To overcome these deficiencies, the present invention provides a method for downloading data from a server to a client, including: transmitting test packets from the server to the client, the test packets including a first test packet of a predetermined length transmitted via a first communication line of a relatively low communication speed, and a second test packet of a predetermined length transmitted via a second communication line of a relatively high communication speed; measuring a first period from start to completion of reception of the first test packet, and a second period from start to completion of reception of the second test packet at the client; transmitting the first period and the second period as information on a test result from the client to the server; receiving the first period and the second period at the server; starting transmission of data packets corresponding to the length of the second test packet from the server to the client via the second communication line; starting, at a point when a latency difference has passed since the start of transmitting the data packets via the second communication line, transmission of check packets corresponding to the length of the first test packet from the server to the client via the first communication line; and issuing a retransmission request to the server via the first communication line for any data packet that should have been received, provided that the data packet has not been received when the check packets are received at the client.

According to another aspect, the present invention provides a method for more efficiently downloading data from a server to a client, including: transmitting test packets from the server to the client, the test packets including a first test packet of a predetermined length transmitted via a first communication line of a relatively low communication speed, and a second test packet of a predetermined length transmitted via a second communication line of a relatively high communication speed; measuring a first period from start to completion of reception of the first test packet, and a second period from start to completion of reception of the second test packet at the client; transmitting the first period and the second period as information on a test result from the client to the server; receiving the first period and the second period at the server; starting transmission of check packets corresponding to the length of the first test packet from the server to the client via the first communication line; starting, at a point when a latency difference has passed since the start of transmitting the check packets via the first communication line, transmission of data packets corresponding to the length of the second test packet from the server to the client via the second communication line; and issuing a retransmission request to the server via the first communication line for any data packet that should have been received, provided that the data packet has not been received when the check packets are received at the client.

According to yet another aspect, the present invention provides a server that allows a client to more efficiently download data, which includes: means for transmitting test packets to the client, the test packets including a first test packet of a predetermined length transmitted via a first communication line of a relatively low communication speed, and a second test packet of a predetermined length transmitted via a second communication line of a relatively high communication speed; means for receiving a first period and a second period transmitted from the client as information on a test result, the first period being from start to completion of reception of the first test packet, the second period being from start to completion of reception of the second test packet; means for starting transmission of data packets corresponding to the length of the second test packet to the client via the second communication line; and means for transmitting, at a point when a latency difference has passed since the start of transmitting the data packets via the second communication line, check packets corresponding to the length of the first test packet to the client via the first communication line.

BRIEF DESCRIPTION OF THE SEVERAL VIEWS OF THE DRAWINGS

FIG. 3 shows transmission efficiencies depending on the arrival timing of mmWave packets and WiFi packets; and FIG. 4 is a conceptual diagram of timing adjustment.

DETAILED DESCRIPTION OF THE PREFERRED EMBODIMENTS

Figure 1:
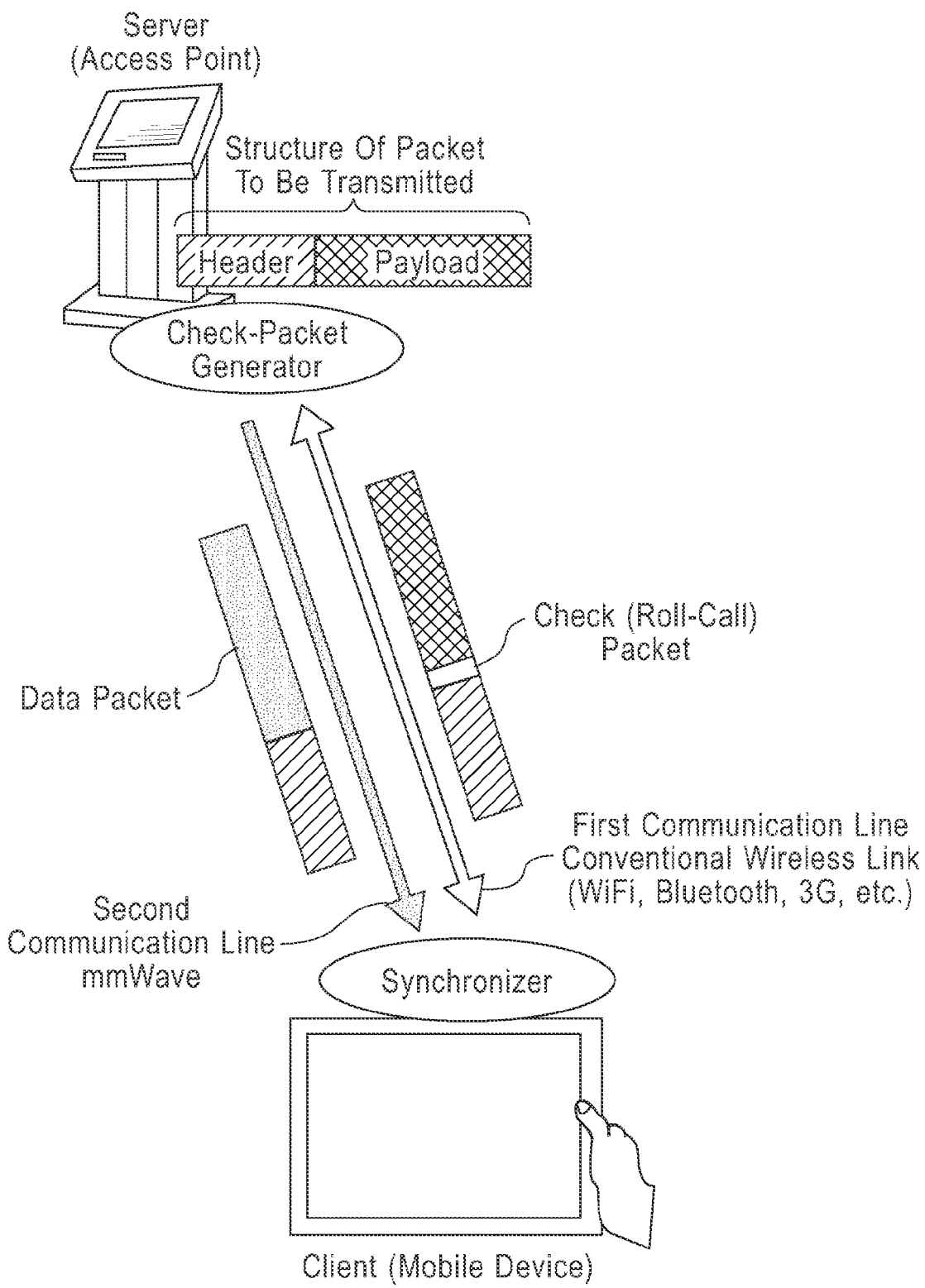
FIG. 1 is a diagram schematically showing the overview of a situation to which the present invention is applied.

FIG. 1 is a diagram schematically showing the overview of a situation to which the present invention is applied. Data, for example file data, is downloaded from a server (access point) to a client (mobile device) by using two wireless links of different characteristics, here a millimeter-wave (also abbreviated as mmWave) link and a conventional wireless link (WiFi, Bluetooth, 3G, etc.). Basic control is performed via a communication line of the conventional wireless link, and data is transmitted via a mmWave communication line.

The server (access point) transmits data packets and check packets. The check packets, generated by a check packet generator, are also called roll-call packets.

A packet typically consists of a header and a payload. The header includes information such as an identification of the payload and the payload includes content data. Application of the present invention is not limited to such a packet structure. The header is transmitted via both the communication line of the conventional wireless link and the mmWave communication line in parallel. The receiver side uses the header for identifying correspondences between the packets (the data packets and the check packets) for use in monitoring and control.

With the fast download of large-size file data in mind, the length of a data packet is illustratively represented to be rather long. However, the data packet may have any predetermined length. For the first communication line of a relatively low communication speed (conventional wireless link such as WiFi), two-way communication between the server and the client is assumed. For the second communication line of a relatively high communication speed (mmWave), one-way communication from the server to the client is assumed. Although the length of a check packet is illustratively represented to be rather short, the check packet may have any predetermined length as long as it can perform a check (roll-call) function. A setting such that one check packet is transmitted for every N mmWave packets (N≥1) is also possible for reducing the overhead.

A synchronizer in the client can measure the time (timing) for packets separately received via the first communication line and the second communication line in parallel and monitor their correspondences. For example, the synchronizer can measure the period from the start to the completion of the reception: for the reception of the data packets and the check packets, the synchronizer can determine whether or not the data packets have been received at the completion of receiving the check packets.

If it is determined that any data packet has not been received, the synchronizer can issue a request, such as a retransmission request for the data packet, to the server via the first communication line (conventional wireless link such as WiFi). If it is determined that the data packets have been received, an acknowledgement of the completion of the reception (that the data packets have arrived) can be returned to the server.

Figure 2:
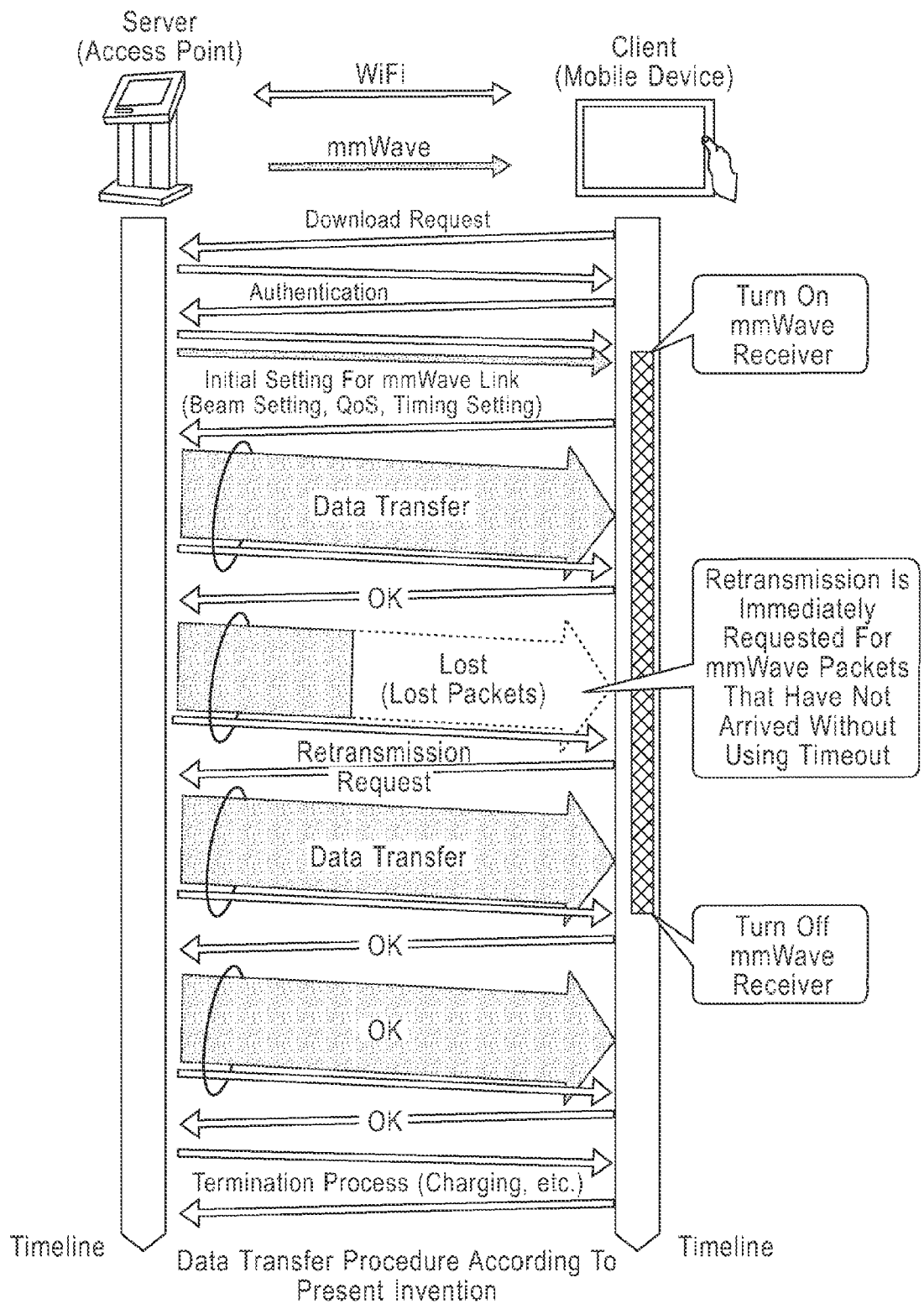
FIG. 2 is a diagram showing a data transfer procedure of the present invention.

FIG. 2 is a diagram showing a data transfer procedure of the present invention. The client (mobile device) issues a data download request to the server (access point). The server then issues a request to the client, in a form like a command, for authentication information belonging to the client. The server receives the authentication information and matches it with authentication information that is recorded (or that can be obtained through communication) to determine whether to allow the client to download data. If the client is allowed to download the data, downloading of the data from the server to the client is started. The process up to this point can be performed with the mmWave receiver powered off.

Initial setting for the mmWave link includes beam setting, QoS, and timing measurement. The setting can be performed on the initiative of the server through commands. Upon starting the initial setting, a mmWave receiver in the client can be powered on in standby mode. Since the mmWave receiver can be powered on only when reception is needed, the power consumption at the client can be reduced.

In the initial setting for the mmWave link, the server transmits test packets to the client. A first test packet of a predetermined length (e.g., consisting of one packet) is transmitted via the first communication line (conventional wireless link such as WiFi) of a relatively low communication speed. A second test packet of a predetermined length (e.g., consisting of N packets (N≥1)) is transmitted via the second communication line (mmWave) of a relatively high communication speed.

The client measures a first period from the start to the completion of the reception of the first test packet, and a second period from the start to the completion of the reception of the second test packet. The client transmits the first and second periods as information on a test result to the server. The server receives the first and second periods.

FIG. 3 shows transmission efficiencies depending on the arrival timing of the mmWave packets and the WiFi packets. The sender, i.e., the server, transmits the data packets via mmWave and separately transmits the check packets via WiFi in parallel. The receiver, i.e., the client, receives the data packets and the check packets. Upon completion of receiving the check packets, the client determines whether the data packets have been received (have arrived) by taking a roll call.

FIG. 3 (A) shows a case in which all the data packets arrive and then the check packets arrive after a short interval. Since a roll call is taken after the arrival of the check packets, loss of time occurs due to the suspended roll call.

FIG. 3 (B) shows a reverse case of FIG. 3 (A), in which, before all the data packets arrive, the check packets arrive and a roll call is taken. Data packets that arrive after the roll call are regarded as lost, and a retransmission request for the lost data packets is transmitted to the sender. Even if the same packet is redundantly transmitted as a result, the data consistency can be maintained by receiving one packet and discarding the rest. However, the transfer efficiency is lowered.

FIG. 3 (C) shows a case in which, immediately before the check packets arrive and a roll call is taken, all the data packets arrive. Theoretically, the most efficient way that allows retransmission requests to be immediately issued with no wasteful waiting time will be as follows: The server starts transmitting the data packets corresponding to the length of the second test packet to the client via the second communication line. Then, at a point (timing) when a latency difference (the second period−the first period) has passed since the start of transmitting the data packets via the second communication line, the server starts transmitting the check (roll-call) packets corresponding to the length of the first test packet to the client via the first communication line.

The meaning of the term "the point (timing) when a latency difference (the second period−the first period) has passed" should not be narrowly interpreted to be limited to one point of time. Rather, it should be broadly interpreted within the scope of technical principles of the present invention, i.e., optimization toward (C), pursuing the efficiency compared with (A) and (B), as above.

Illustratively, in the patterns (A), (B), and (C), the transmission of the data packets is started first and then the transmission of the check packets is started. This will often apply to cases that the data packets constitute file data of a large size. If the transmission rate for the check packets is considerably low, it may be necessary to start the transmission of the check packets first. In such a case, "the point (timing) when a latency difference (the second period−the first period) has passed" can be replaced with "the point (timing) when a latency difference (the first period−the second period) has passed."

The time it takes for transmitted data to be received, i.e., the latency, occurs due to hardware and software causes. Therefore, the latency depends on the type of the server, the type of the mobile device at the client, the distance between the server and the client, and the use environment (a situation with many external noises, intervention of a shielding object, or temporary disconnection by passersby). Checking the link condition by preliminarily transmitting and receiving the first and second test packets (see FIG. 2) has a significant meaning also in this sense.

FIG. 4 is a conceptual diagram of timing adjustment. As shown in FIG. 4 (A), at the stage of the initial setting for the mmWave link, the latency difference between mmWave and WiFi is measured. At the time of file transfer, the data packets and the check packets are transmitted with a time difference (latency difference) between mmWave and WiFi, as shown in FIG. 4 (B).

The predetermined length of the first test packet and the predetermined length of the second test packet can be normalized by taking a relative difference in communication speed into account. This facilitates computing the length of the data packets and the length of the check packets to be transmitted in the next step. That is, it is to be noted that the length of the check packets "corresponding to the predetermined length" of the first test packet, and the length of the data packets "corresponding to the predetermined length" of the second test packet do not mean that the check packets and the data packets have the same length as the respective test packets transmitted in the previous step. Rather, it means that the packets have lengths computed with reference to the normalized predetermined lengths of the respective test packets.

mmWave can realize wireless communication with the speed of several gigabits/sec. Even one millisecond of waiting time in transferring a set of one or more data packets and a check packet causes several megabits of delay. In actual file transfer, since a set of one or more data packets and a check packet is repeatedly transferred depending on the file size, the accumulated delay becomes large. For example, for file transfer in which a set of one or more data packets and a check packet is repeatedly transferred for 1000 times, the delay becomes one second (corresponding to several gigabits).

Returning to FIG. 2, after the client provides a download completion notification as OK, the client may power off the mmWave receiver in the client for reducing the power consumption. In a termination process, the server may perform a process associated with the download service provided to the client, such as charging the client for the download service, by referring to the authentication information belonging to the client. The termination process can be performed via the first communication line (conventional wireless link such as WiFi) of a relatively low communication speed.

The method of the present invention can be implemented by a computer program product including a computer readable storage medium having computer readable non-transient program code embodied therein. Since the present invention is implemented with role-sharing in a server-client relationship, the present invention can be embodied as a server that takes partial roles, a client that takes partial roles or a program for causing the server or the client to perform their partial roles. The server that takes partial roles can include means for performing the various functions of the server, including but not limited to means for transmitting test packets, means for receiving a first period and a second period, means for starting transmission of data packets, and means for transmitting check packets.

What is claimed is:

1. A method for downloading data from a server to a client, comprising:
    transmitting test packets from said server to said client, said test packets including a first test packet of a predetermined length transmitted via a first communication line of a relatively low communication speed, and a second test packet of a predetermined length transmitted via a second communication line of a relatively high communication speed;
    measuring a first period from start to completion of reception of said first test packet, and a second period from start to completion of reception of said second test packet at said client;
    transmitting said first period and said second period as information on a test result from said client to said server;
    receiving said first period and said second period at said server;
    starting transmission of data packets corresponding to said length of said second test packet from said server to said client via said second communication line;
    starting, at a point when a latency difference has passed since the start of transmitting said data packets via said second communication line, transmission of check packets corresponding to said length of said first test packet from said server to said client via said first communication line; and
    issuing a retransmission request to said server via said first communication line for any data packet that should have been received, provided that said data packet has not been received when said check packets are received at said client.

2. The method according to claim 1, further comprising, prior to transmitting said test packets:
    issuing a data download request from said client to said server;
    issuing a request for authentication information belonging to said client from said server to said client;
    transmitting said authentication information belonging to said client from said client to said server; and
    receiving said authentication information at said server and matching said authentication information to determine whether to allow said client to download data.

3. The method according to claim 1, wherein said first communication line comprises a WiFi connection.

4. The method according to claim 1, wherein said second communication line comprises a mmWave wireless communication.

5. The method according to claim 1, wherein said first test packet comprises one packet and said second test packet comprises at least one packet.

6. The method according to claim 1, wherein said latency difference comprises said second period minus said first period.

7. A method for more efficiently downloading data from a server to a client, comprising:

transmitting test packets from said server to said client, said test packets including a first test packet of a predetermined length transmitted via a first communication line of a relatively low communication speed, and a second test packet of a predetermined length transmitted via a second communication line of a relatively high communication speed;

measuring a first period from start to completion of reception of said first test packet, and a second period from start to completion of reception of said second test packet at said client;

transmitting said first period and said second period as information on a test result from said client to said server;

receiving said first period and said second period at said server;

starting transmission of check packets corresponding to said length of said first test packet from said server to said client via said first communication line;

starting, at a point when a latency difference has passed since the start of transmitting said check packets via said first communication line, transmission of data packets corresponding to said length of said second test packet from said server to said client via said second communication line; and issuing a retransmission request to said server via said first communication line for any data packet that should have been received, provided that said data packet has not been received when said check packets are received at said client.

8. The method according to claim 7, wherein said first communication line comprises a WiFi connection.

9. The method according to claim 7, wherein said second communication line comprises a mmWave wireless communication.

10. The method according to claim 7, wherein said first test packet comprises one packet and said second test packet comprises at least one packet.

11. The method according to claim 7, wherein said latency difference comprises said first period minus said second period.

12. A computer program product for more efficiently downloading data from a server, the computer program product comprising:

a computer readable storage medium having computer readable non-transient program code embodied therein, the computer readable program code comprising:

computer readable program code configured to perform the steps of a method according to claim 1.

13. A computer program product for more efficiently downloading data from a server, the computer program product comprising:

a computer readable storage medium having computer readable non-transient program code embodied therein, the computer readable program code comprising:

computer readable program code configured to perform the steps of a method according to claim 3.

* * * * *